US007373169B2

(12) United States Patent
Yoshino

(10) Patent No.: US 7,373,169 B2
(45) **Date of Patent: *May 13, 2008**

(54) EARPHONE ANTENNA AND PORTABLE RADIO EQUIPMENT PROVIDED WITH EARPHONE ANTENNA

(75) Inventor: Yoshitaka Yoshino, Tokyo (JP)

(73) Assignee: Sony Corporation (JP)

( * ) Notice: Subject to any disclaimer, the term of this patent is extended or adjusted under 35 U.S.C. 154(b) by 309 days.

This patent is subject to a terminal disclaimer.

(21) Appl. No.: 11/144,572

(22) Filed: Jun. 3, 2005

(65) Prior Publication Data

US 2006/0014560 A1 Jan. 19, 2006

(30) Foreign Application Priority Data

Jun. 4, 2004 (JP) .......................... P2004-167551

(51) Int. Cl.
*H04M 1/00* (2006.01)

(52) U.S. Cl. .............................. 455/550.1; 455/569.1; 455/575.1; 455/575.5; 455/575.8; 343/702; 343/718; 343/900; 343/906; 379/21; 379/22; 379/26

(58) Field of Classification Search ............ 455/575.5, 455/550.1, 569.1, 575.1, 575.8; 343/702, 343/718, 900
See application file for complete search history.

(56) References Cited

U.S. PATENT DOCUMENTS

| | | | | |
|---|---|---|---|---|
| 3,720,874 | A | 3/1973 | Gorcik et al. | |
| 4,369,521 | A * | 1/1983 | Sawada | 455/270 |
| 5,361,405 | A | 11/1994 | Ramsey | |
| 5,487,182 | A | 1/1996 | Hansson | |
| 5,574,769 | A | 11/1996 | Clement | |
| 6,821,158 | B2 | 11/2004 | Iida et al. | |
| 6,845,253 | B1 | 1/2005 | Schantz | |
| 7,064,720 | B2 * | 6/2006 | Yoshino | 343/702 |
| 7,236,137 | B2 * | 6/2007 | Yoshino et al. | 343/718 |
| 2004/0138723 | A1 | 7/2004 | Malick et al. | |
| 2005/0245289 | A1 * | 11/2005 | Yoshino | 455/569.1 |
| 2007/0032130 | A1 * | 2/2007 | Yoshino | 439/578 |

FOREIGN PATENT DOCUMENTS

| | | |
|---|---|---|
| GB | 2 382 722 A | 6/2003 |
| GB | 2 393 858 A | 4/2004 |
| JP | 48-002637 | 1/1973 |

(Continued)

*Primary Examiner*—Lana Le
*Assistant Examiner*—Muhammad Akbar
(74) *Attorney, Agent, or Firm*—Lerner, David, Littenberg, Krumholz & Mentlik, LLP

(57) ABSTRACT

An earphone antenna includes an audio signal transmission path formed by connecting a first shield wire of a coaxial cable to a ground, connecting a central conductor of the coaxial cable to a pair of first signal lines of an earphone cable via a capacitor which exhibits high impedance in a frequency range of audio signals and low impedance in a frequency range of high frequency signals, and connecting a second signal line and a grounding wire, respectively, to the pair of first signal lines via a high frequency choke which exhibits low impedance in the frequency range of audio signals and high impedance in the frequency range of high frequency signals. Connecting the second shield wire to the ground causes formation of a sleeve antenna by the earphone cable and the second shield wire.

7 Claims, 7 Drawing Sheets

FOREIGN PATENT DOCUMENTS

| | | | |
|---|---|---|---|
| JP | 49-056844 | | 6/1974 |
| JP | 52-077636 | | 6/1977 |
| JP | 59-108348 | | 6/1984 |
| JP | 59-132475 | A | 7/1984 |
| JP | 61-035412 | | 2/1986 |
| JP | 63-070742 | | 3/1988 |
| JP | 03-109414 | | 5/1991 |
| JP | 04-056530 | A | 2/1992 |
| JP | 06-088015 | | 3/1994 |
| JP | 08-065026 | | 3/1996 |
| JP | 09-199237 | A | 7/1997 |
| JP | 09-331209 | | 12/1997 |
| JP | 2003-163529 | A | 6/2003 |
| JP | 2005-136587 | | 5/2005 |
| WO | WO 03/026342 | A2 * | 3/2003 |
| WO | WO-03/026342 | A2 | 3/2003 |

* cited by examiner

EARPHONE ANTENNA AND PORTABLE RADIO EQUIPMENT PROVIDED WITH EARPHONE ANTENNA

CROSS-REFERENCE TO RELATED APPLICATIONS

The present application claims priority from Japanese Patent Application No. JP2004-167551 filed on Jun. 4, 2004, the disclosure of which is hereby incorporated by reference herein.

BACKGROUND OF THE INVENTION

The present invention relates to an earphone antenna for portable radio equipment which is put on a human body during use, and to portable radio equipment provided with this earphone antenna.

Conventionally, in portable radio equipment to be carried on a human body during use, such as a pager, a radio receiver, an LCD television receiver and the like, a rod antenna or an earphone antenna which utilizes a signal wire for transmitting audio signals to earphones is used as an antenna. For example, such an earphone antenna is disclosed in Japanese Patent Application Publication No. 2003-163529.

In the portable radio equipment which uses a rod antenna and/or an earphone antenna, when put on a human body for use, there has been a problem that because of a significant deterioration of antenna performance when put on the human body, such as in television broadcasts where signals with a large amount of information, e.g., video signals, are processed, a sufficient reception sensitivity cannot be obtained.

In particular, the earphone antenna which utilizes the signal wire for transmitting audio signals to the earphones as an antenna has had a problem that because the earphone and/or the signal wire make direct contact with the human body, the human body has caused a significant influence on the radio equipment via the antenna to substantially deteriorate the stability of reception.

Further, in television broadcasts in Japan, for example, VHF bands from 90 to 108 MHz (1-3 channels), and from 170 to 222 MHz (4-12 channels), as well as the UHF band from 470 to 770 MHz (13-62 channels) are used. Therefore, an LCD television receiver for receiving television broadcasts is required to receive high frequency signals in an extremely wide band range from 90 to 770 MHz. Accordingly, with a conventional rod antenna or earphone antenna, the performance of which is inferior to a fixed-type antenna, it has been extremely difficult to secure a sufficient sensitivity in the required frequency band range.

Still further, because the rod antenna and the earphone antenna are monopole antennas which resonate at $\lambda/4$, their reception sensitivity is greatly influenced by the ground size of the portable radio terminal, thereby limiting the design of the portable radio equipment.

SUMMARY OF THE INVENTION

The present invention is contemplated to solve the aforementioned problems associated with the conventional art, and it is desirable to provide an earphone antenna which is capable of reducing the influence of the human body to achieve a high gain in a wide band range, and also provide portable radio equipment which secures reception stability.

The above and other aims, features and advantages of the present invention will become more apparent from the following description of the presently preferred exemplary embodiment of the invention.

An earphone antenna according to an embodiment of the present invention includes a first earphone cable including a pair of insulation-coated first signal lines for supplying audio signals to an earphone; a shielded cable including a coaxial cable, an insulation-coated second signal line for audio signals and a grounding wire, the coaxial cable having a central conductor passing high frequency signals surrounded by an insulator and further surrounded by a first shield wire, the coaxial cable, the second signal line and the grounding wire collectively being surrounded by an insulation material and a second shield wire; a multipin connector arranged on one end of the shielded cable and adapted to electrically connect the shielded cable to a radio apparatus; and a connection block connecting the other end of the shielded cable to the first earphone cable, the connection block including an audio signal transmission path formed by connecting the first shield wire of the coaxial cable to a ground, connecting the central conductor of the coaxial cable to the pair of first signal lines via a capacitor which exhibits high impedance in a frequency range of audio signals and low impedance in a frequency range of high frequency signals, and connecting the second signal line for audio signals and the grounding wire, respectively, to the pair of first signal lines via a high frequency choke which exhibits low impedance in the frequency range of audio signals and high impedance in the frequency range of high frequency signals; wherein connecting the second shield wire to the ground causes formation of a sleeve antenna by the first earphone cable and the second shield wire.

Further, a portable radio apparatus according to another embodiment of the present invention includes a main body having a tuner, an audio signal output unit and a multipin jack connected to the tuner and to the audio signal output unit; and an earphone antenna including an earphone cable having a pair of insulation-coated first signal lines for supplying audio signals to an earphone; a shielded cable including a coaxial cable, an insulation-coated second signal line for audio signals and a grounding wire, the coaxial cable having a central conductor passing high frequency signals surrounded by an insulator and further surrounded by a first shield wire, the coaxial cable, the second signal line and the grounding wire collectively being surrounded by an insulation material and a second shield wire; a multipin connector arranged on one end of the shielded cable and adapted for electrical connection to the multipin jack; and a connection block connecting the other end of the shielded cable to the earphone cable, the connection block including an audio signal transmission path formed by connecting the first shield wire of the coaxial cable to a ground, connecting the central conductor of the coaxial cable to the pair of first signal lines via a capacitor which exhibits high impedance in a frequency range of audio signals and low impedance in a frequency range of high frequency signals, and connecting the second signal line for audio signals and the grounding wire, respectively, to the pair of first signal lines via a high frequency choke which exhibits low impedance in the frequency range of audio signals and high impedance in the frequency range of high frequency signals; wherein connecting the second shield wire to the ground causes formation of a sleeve antenna by the earphone cable and the second shield wire.

According to the earphone antenna of an embodiment of the present invention, because the transmission path for audio signals is formed by connecting the first shield wire of the coaxial cable to the ground in the connection block described above, connecting the central conductor of the coaxial cable to the pair of first signal lines via a capacitor which exhibits high impedance in the frequency range of audio signals and low impedance in the frequency range of high frequency signals, and then connecting the second signal line for audio signals and the grounding wire, respectively, to the pair of first signal lines via a high frequency choke which exhibits low impedance in the frequency range of audio signals and high impedance in the frequency range of high frequency signals, a sleeve antenna composed of the first earphone cable and the second shield wire is formed by connecting the second shield wire to the ground. The sleeve antenna reduces the influence of the human body and obtains a high gain over a wide range of frequencies.

An earphone antenna according to an embodiment of the present invention may further include a second earphone cable including a second pair of insulation-coated first signal lines for supplying audio signals to an earphone; the connection block connecting the other end of the shielded cable to the second earphone cable, the connection block further including another audio signal transmission path formed by connecting the central conductor of the coaxial cable to the second pair of first signal lines via a capacitor which exhibits high impedance in the frequency range of audio signals and low impedance in the frequency range of high frequency signals, and connecting the second signal line for audio signals and the grounding wire, respectively, to the pair of second signal lines via a high frequency choke which exhibits low impedance in the frequency range of audio signals and high impedance in the frequency range of high frequency signals; wherein connecting the second shield wire to the ground causes formation of a sleeve antenna by the second earphone cable and the second shield wire; a first stereophonic earphone connected to the connection block via the first earphone cable; a second stereophonic earphone connected to the connection block via the second earphone cable; and a high frequency choke inserted in an en-route portion to at least one of the first and second earphone cables so as to create a resonance frequency in the first earphone cable which is different from the resonance frequency in the second earphone cable.

Further, the earphone antenna according to an embodiment of the present invention may include a microphone and a switch mounted on the connection block.

Still further, the earphone antenna according to an embodiment of the present invention may include an amplifier mounted on the connection block.

In a portable radio apparatus according to an embodiment of the present invention, the multipin connector of the earphone antenna is adapted for electrical connection to a multipin jack in the radio apparatus, and in the connection block of the earphone antenna, a transmission path for audio signals is formed by connecting the first shield wire of the coaxial cable to the ground, connecting the central conductor of the coaxial cable to the pair of first signal lines via a capacitor which exhibits high impedance in the frequency range of audio signals and low impedance in the frequency range of high frequency signals, and connecting the second signal line for audio signals and the grounding wire, respectively, to the pair of first signal lines via a high frequency choke which exhibits low impedance in the frequency range of audio signals and high impedance in the frequency range of high frequency signals; wherein an earphone antenna, which is a sleeve antenna composed of the earphone cable and the second shield wire, is formed by connecting the second shield wire to the ground. As a result, stable reception over a wide band range is secured.

Further features of the invention, and the advantages offered thereby, are explained in detail hereinafter, with reference to specific embodiments of the invention illustrated in the accompanying drawings.

DETAILED DESCRIPTION

A preferred exemplary embodiment of the present invention will be described in detail by referring to the accompanying drawings in the following. However, it should be understood that the present invention is not limited thereto, and many changes and modifications thereof can be contemplated within the scope of the present invention.

Figure 1:
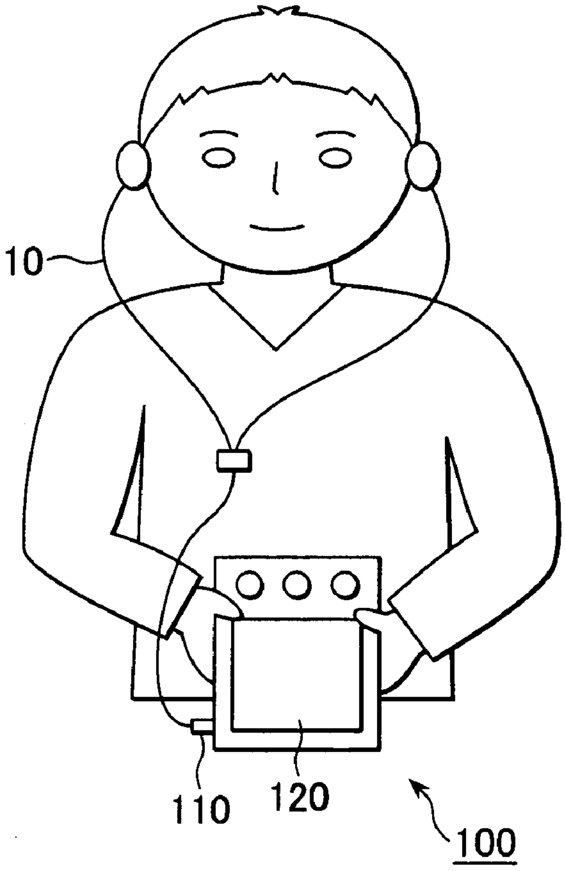
FIG. 1 is a block diagram showing the configuration of an LCD television receiver according to the present invention.

The present invention is applicable to, for example, an LCD television receiver 100 shown in FIG. 1. In this liquid crystal display television receiver 100, an earphone antenna 10 according to an embodiment of the present invention is connected to the main body of the receiver 120 via a pin jack connector 110.

Figure 2:
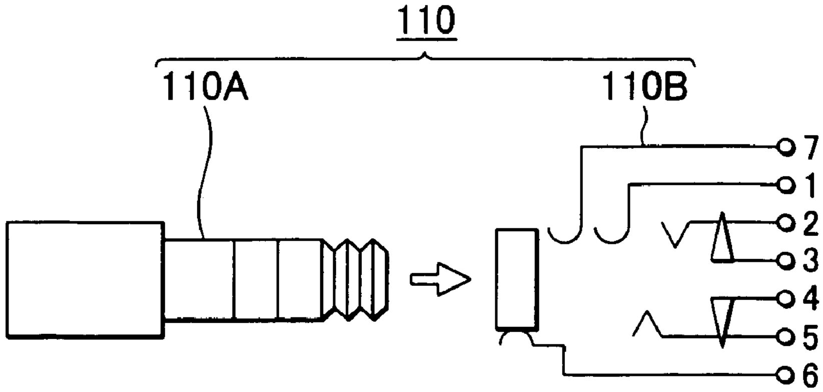
FIG. 2 is a diagram showing the configuration of a pin-jack connector for connecting between the main body of the receiver and an earphone antenna in the LCD television receiver.

The pin jack connector 110, as shown in FIG. 2, is composed of a five-electrode pin 110A and a jack 110B to which five kinds of lines, i.e., antenna 7, headphone detection 1, audio L channel 2, audio R channel 5, and ground 6 are connected, respectively.

Figure 3:
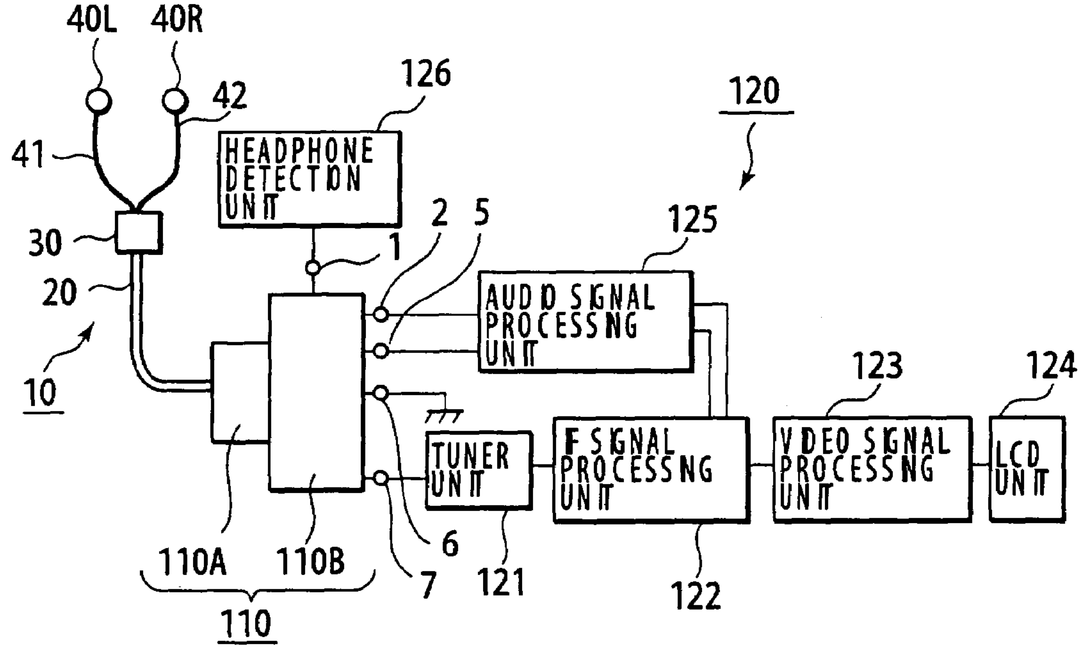
FIG. 3 is a block diagram showing the configuration of the main body of the receiver.

In the main body of the receiver 120, as shown in FIG. 3, there are provided a tuner unit 121, an IF signal processing unit 122 connected to the tuner unit 121, a video signal processing unit 123 and an audio signal processing unit 125 both connected to the IF signal processing unit 122, a liquid crystal display unit 124 connected to the video signal processing unit 123, and the jack 110B of the pin jack connector 110 described above.

In the LCD television receiver 100, the jack 110B described above has five movable terminals 1, 2, 5, 6, 7 and two fixed terminals 3, 4 as shown in FIG. 2, wherein, as shown in FIG. 3, the movable terminal 7 is connected to the tuner unit 121 as an antenna terminal 7, and the movable terminals 2, 5 are connected to the audio signal processing unit 125 as audio L channel terminal 2 and audio R channel terminal 5. And the headphone detection terminal 1 is connected to a headphone detection unit 126. Movable terminal 6 is connected to GND of a substrate in the main body of the radio equipment as a common ground terminal (Gnd) of the radio equipment. Fixed terminals 3, 4 are terminals for firmly holding the pins.

The earphone antenna 10 is composed of a shielded cable 20, one end of which is connected to the main body of the receiver 120 via the five pin jack connector 110 described above, a connection block 30 which is connected to the other end of the shielded cable 20, and stereophonic earphones 40L, 40R which are connected to the connection block 30 via respective earphone cables 41, 42.

By way of example, although not shown here, a capacitor with approximately 1000 pF capacitance is normally inserted between the movable terminal 7 and the tuner unit 121 for protection against breakdown.

Figure 4:
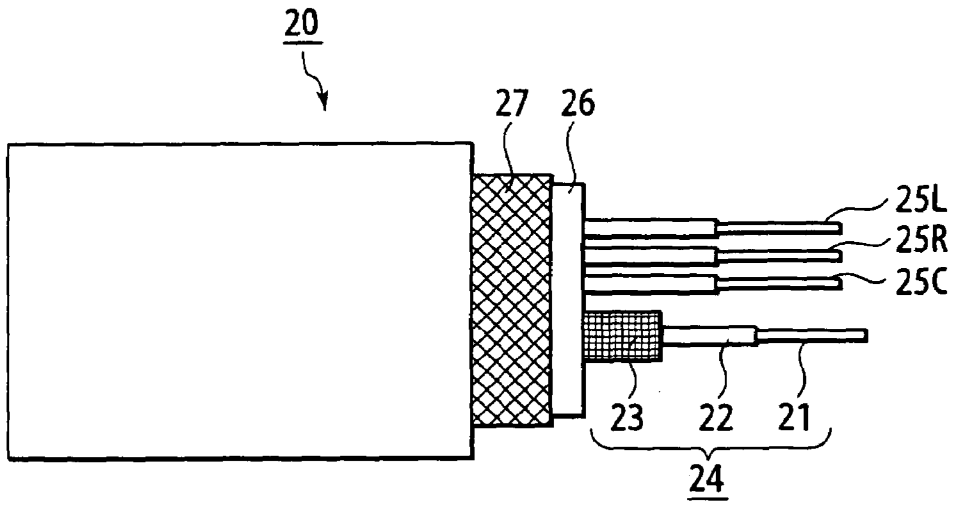
FIG. 4 is a diagram showing the configuration of a shielded cable which forms part of the earphone antenna.

As shown in FIG. 4, the shielded cable 20 is composed of a coaxial cable 24 having a central conductor 21 for transmitting high frequency signals, which is coated with an insulator 22 and further covered with a shield wire 23; signal lines 25L, 25R for audio signals which are insulation-coated; and a signal line for headphone detection 25C. The exterior of these cables/signal lines is surrounded by an insulation sheet 26 made of paper or vinyl sheet which, in turn, is surrounded by a shield wire 27 having a wound soft copper structure or a braided structure.

One end of the shielded cable 20 is provided with the five-pin connector 110A which is connected to the central conductor 21 and the shield wire 23 of the coaxial cable 24, signal lines 25L, 25R for audio signals, and the headphone detection signal wire 25C. Further, the connection block 30 is provided at the other end of the shielded cable 20. The connection block 30 is connected to the central conductor 21 and the shield wire 23 of the coaxial cable 24, the signal lines 25L, 25R for audio signals, the headphone detection signal line 25C, and the shield wire 27. It should be noted that although the shield wire 27 which covers the coaxial cable 24, audio signal lines 25L, 25R and the headphone detection signal line 25C is connected to the connection block 30, it is not connected to the aforementioned pin 110A.

By way of example, in this preferred embodiment, although the shield wire 23 of the coaxial cable 24 is used as a common grounding wire for the central conductor 21 and the signal lines 25L, 25R for audio signals, it is not limited thereto, and a grounding wire for the signal lines 25L, 25R for audio signals may be provided additionally. Alternatively, an LCD television receiver 100 which is not provided with a headphone detection unit 126 may be configured such that the headphone detection signal line 25C is used as a grounding wire for the signal lines 25L, 25R for audio signals.

Figure 5:
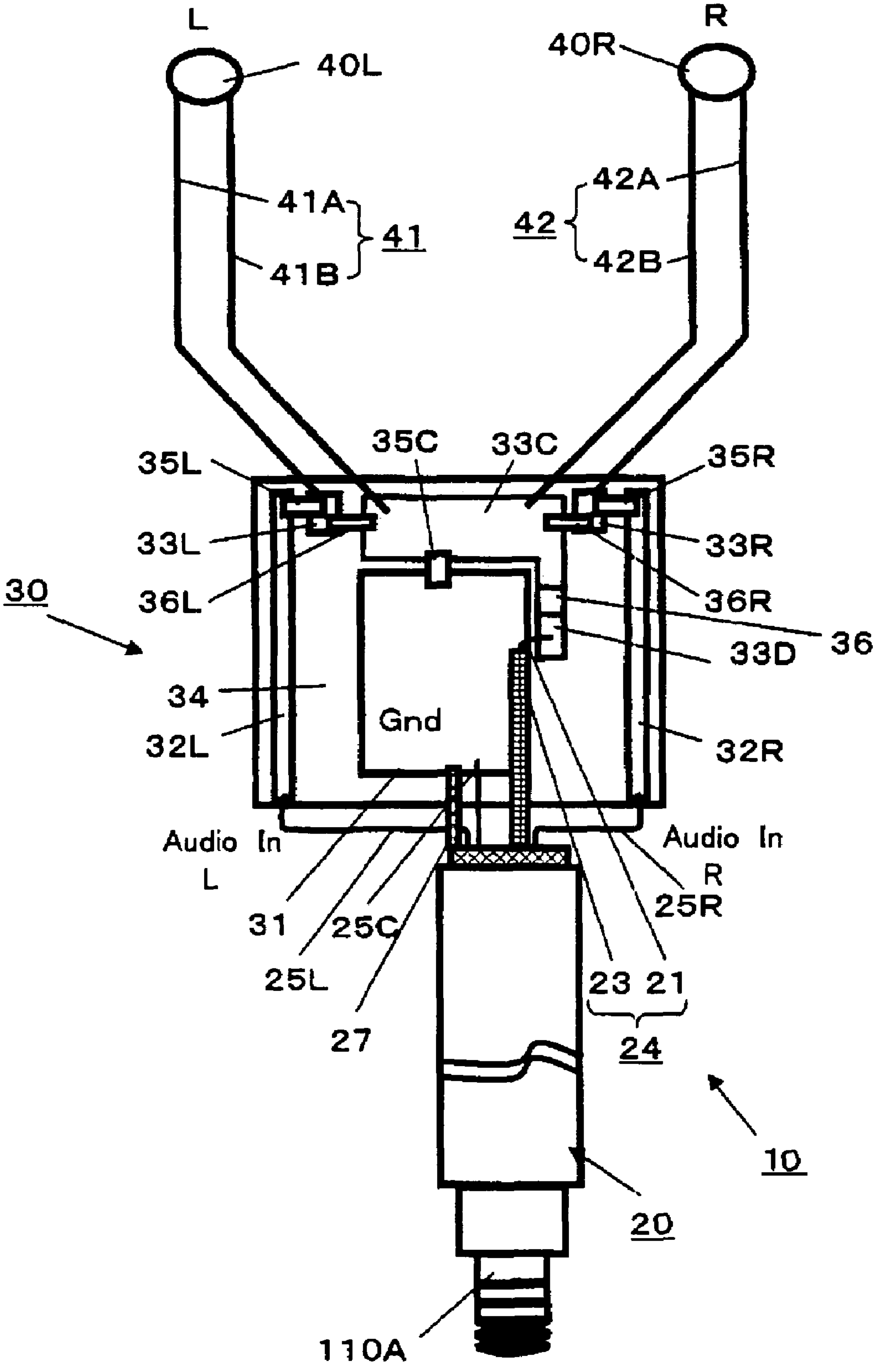
FIG. 5 is a diagram showing the configuration of a connection block which forms part of the earphone antenna.

As shown in FIG. 5, the connection block 30 has a substrate 34 on which are formed a ground pattern 31 in the center thereof, transmission line patterns 32L, 32R for stereophonic audio signals which are positioned on both sides of the ground pattern 31, three connection lands 33L, 33R and 33C positioned at leading edge portions of the ground pattern 31, and a connection land 33D positioned on one side of the ground pattern 31. In connection block 30, an end portion of each transmission line pattern 32L, 32R for the stereophonic audio signals is connected via a high frequency choke 35L, 35R to the first and the second connection lands 33L, 33R, respectively. Further, the ground pattern 31 is connected to the third connection land 33C via a high frequency choke 35C. Still further, the first connection land 33L and the third connection land 33C are connected via a chip capacitor 36L, and the second connection land 33R and the third connection land 33C are connected via a chip capacitor 36R. In addition, the third connection land 33C and the fourth connection land 33D are connected via a chip capacitor 36.

Also, in the connection block 30, a left-side earphone cable 41 including two signal lines 41A, 41B for supplying left channel audio signals to a left-side earphone 40L is connected to the first connection land 33L and the third connection land 33C. Further, a right-side earphone cable 42 including two signal lines 42A, 42B for supplying right channel audio signals to a right-side earphone 40R is connected to the second connection land 33R and the third connection land 33C.

The aforementioned shielded cable 20 is connected to the connection block 30 as follows.

The left side audio signal line 25L and the right side signal line 25R of the shielded cable 20 are respectively connected to the transmission line patterns 32L and 32R for audio signals formed on the substrate 34, and the headphone detection signal line 25C thereof is connected to the ground pattern 31. Further, the central conductor 21 and the shield wire 23 which make up the coaxial cable 24 are mounted on the ground pattern 31, the shield wire 23 thereof is connected to the ground pattern 31 and an end of the central conductor 21 is connected to the fourth connection land 33D. Still further, the shield wire 27 is directly connected to the ground pattern 31.

By way of example, the chip capacitor 36 for connecting between the third connection land 33C and the fourth connection land 33D may be substituted with a capacitor for breakdown prevention, which is not shown, inserted between the movable terminal 7 and the tuner unit 121. In such case, the end of the central conductor 21 of the coaxial cable 24 would be directly connected to the third connection land 33C.

Here, in this preferred exemplary embodiment of the invention, the aforementioned high frequency chokes 35L, 35R and 35C may include ferrite beads, for example, BLM18HD102SN1, size 1608 produced by Murata Manufacturing Ltd. The high frequency chokes 35L, 35R and 35C which use these ferrite beads exhibit low impedance to audio signals in the frequency band below 20 kHz and high impedance to high frequency signals, thereby preventing the passage of high frequency signals. Further, as the chip capacitors 36L, 36R and 36C, capacitors having a capacitance of 10 pF may be used, respectively, so as to exhibit high impedance to audio signals in the frequency band below 20 kHz in order to block the passage of such audio signals, and low impedance to high frequency signals.

Figure 6:
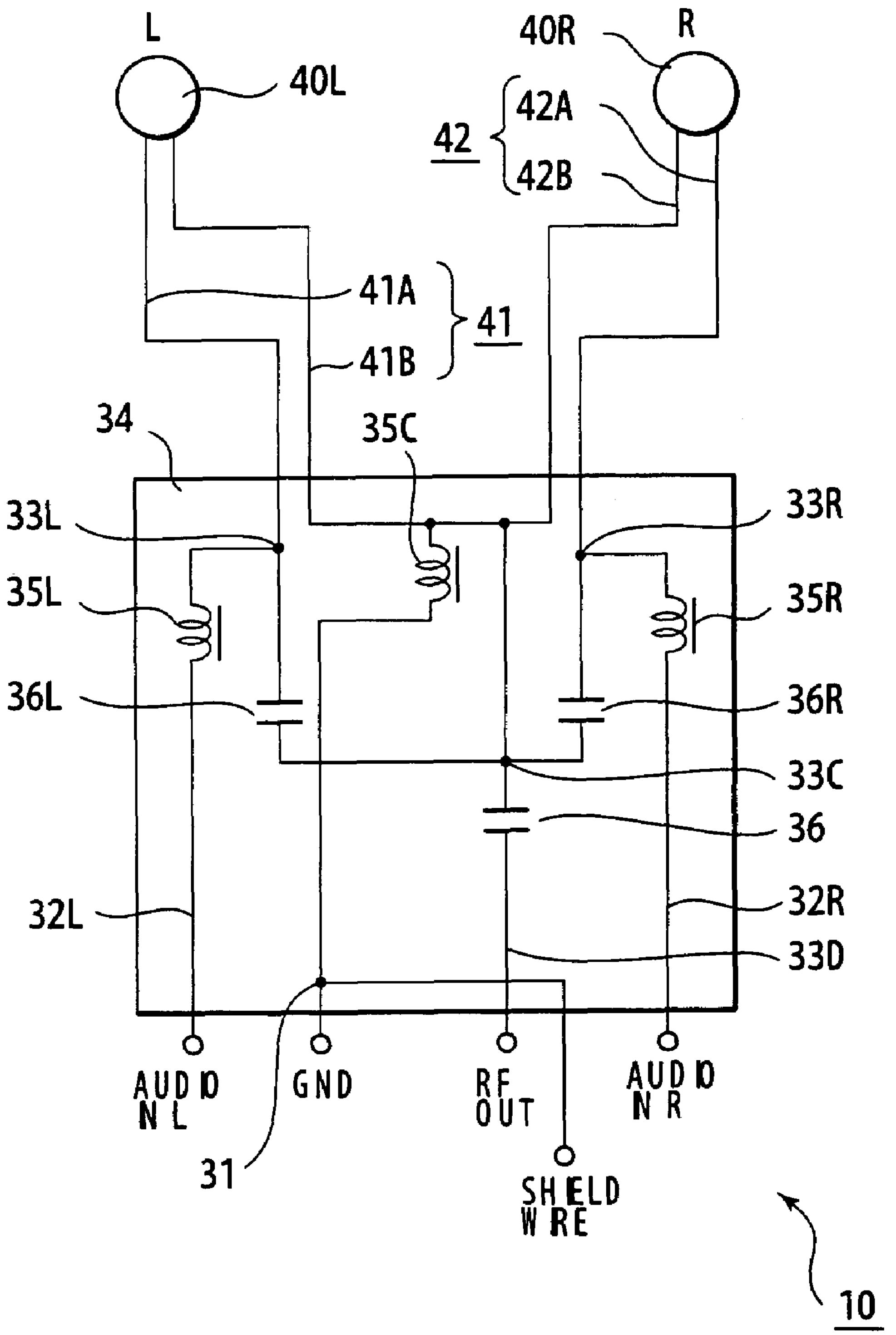
FIG. 6 is a schematic circuitry diagram showing the electrical configuration of the earphone antenna.

Earphone antenna 10, as indicated in the schematic electrical circuitry diagram shown in FIG. 6, has earphone cables 41, 42 led out therefrom. Cable 41 includes left signal line 41A and GND 41B, while cable 42 includes right signal line 42A and GND 42B, for transmitting audio signals to the speakers 40L, 40R, respectively, of stereophonic earphones. Then, in order to separate the audio signals from high frequency signals, high frequency wave chokes 35L, 35R and 35C using ferrite beads, which exhibit high impedance (1 kΩ or greater) in the frequency band used in television broadcasts and low impedance in the audio frequency band (less than 20 kHz), are provided at input portions of the audio signals and at a ground portion, i.e., at connection lands 33L, 33R and 33C, thereby separating the audio signals and the high frequency signals.

That is, because the earphone cables 41, 42, each including two signal lines 41A, 41B/42A, 42B on each side, are connected to the central conductor 21, which is a signal line of the coaxial cable 24 associated with high frequency, in order to separate the audio signals therefrom, they are configured to connect between the connection lands 33L or 33R and 33C via chip capacitors 36L, 36R of 10 pF, so as to separate out signals in the audio band range and pass RF signals (frequency range of television bands).

The frequency bands allocated for use in television broadcasts in Japan are 90M to 108 MHz (1-3 channels) and 170M to 222 MHz (4-12 channels) in VHF, and 470M to 770 MHz (13-62 channels) in the UHF band.

Therefore, according to the earphone antenna 10, by directly connecting the shield wire 27 which covers the coaxial cable 24 and the signal lines 25L, 25R for audio signals to GND 31, a sleeve antenna structure is provided in which the earphone cables 41, 42 and the shield wire 27 form an aerial which resonates over its line length, wherein respective lengths thereof are adjusted so as to be able to receive 100 MHz in the VHF band.

In the earphone antenna 10 according to this exemplary embodiment of the invention, the characteristic impedance of the coaxial cable 24 is set at 75 Ω, the length of the shielded cable 20 at 70 cm, and the lengths of the earphone cables 41, 42 at 50 cm to adjust the antenna to resonate at 100 MHz. For 200 MHz, it is configured to be able to receive as a 1 λ antenna. In UHF, it is configured to use harmonic oscillations of 100 MHz and 200 MHz (triple, quintuple, septuple waves).

The earphone antenna 10 according to the embodiment of the invention, Because of its sleeve structure, is stabilized as an antenna, and various functions can be added to the connection block 30.

Figure 7:
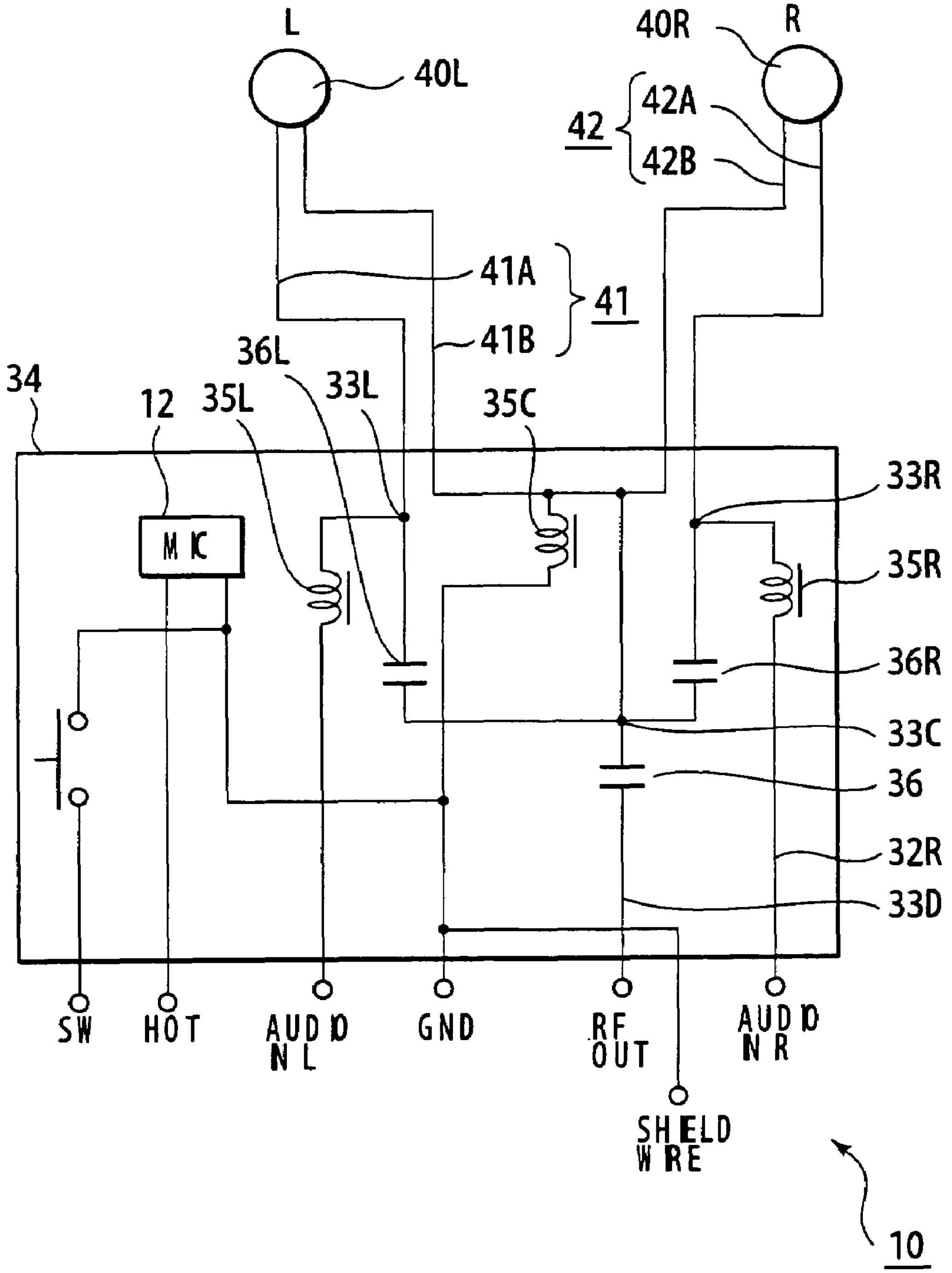
FIG. 7 is a schematic circuitry diagram showing the electrical configuration of an earphone antenna which incorporates a microphone mounted in the connection block.
Figure 8:
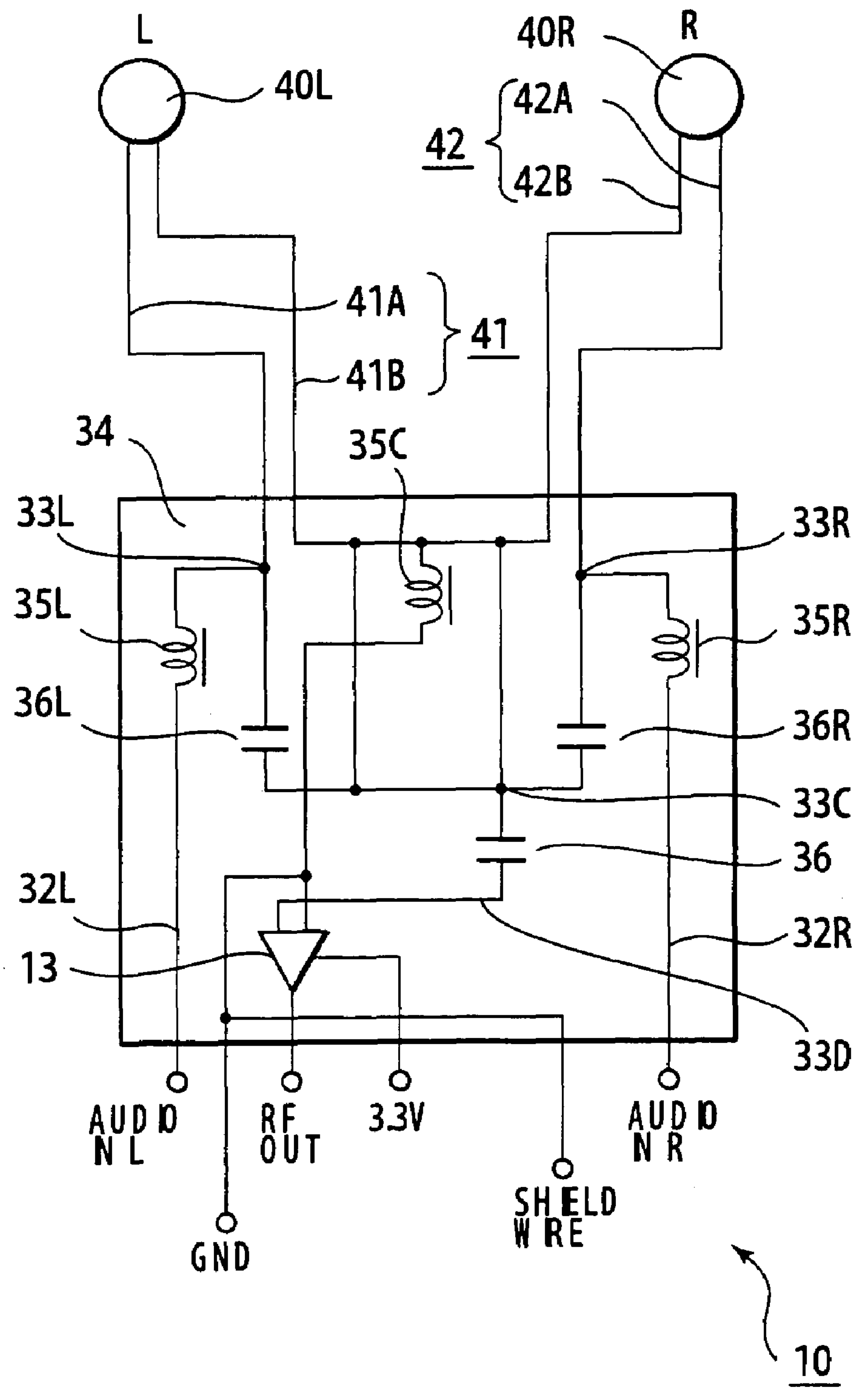
FIG. 8 is a schematic circuitry diagram showing the electrical configuration of an earphone antenna incorporating an amplifier mounted in the connection block.

For example, for use in a potable telephone, the function of a microphone 12 can be added thereto without decreasing antenna gain by implementing the circuit configuration shown in FIG. 7 incorporating the microphone and a switch. Also, by adding an amplifier 13 as shown in FIG. 8, the amplifier 13 may be placed in the vicinity of the antenna so as to achieve a significant improvement in NF (noise factor) as a system.

In the earphone antenna 10 described above, the lengths of the two earphone cables 41, 42 are set to be equal. However, it is possible to vary the respective lengths of the two earphone cables 41, 42 from the connection lands 33L, 33R and 33C in the connection block 30 to the earphones 40L, 40R, so as to be able to correspond to different frequencies as well.

Figure 9:
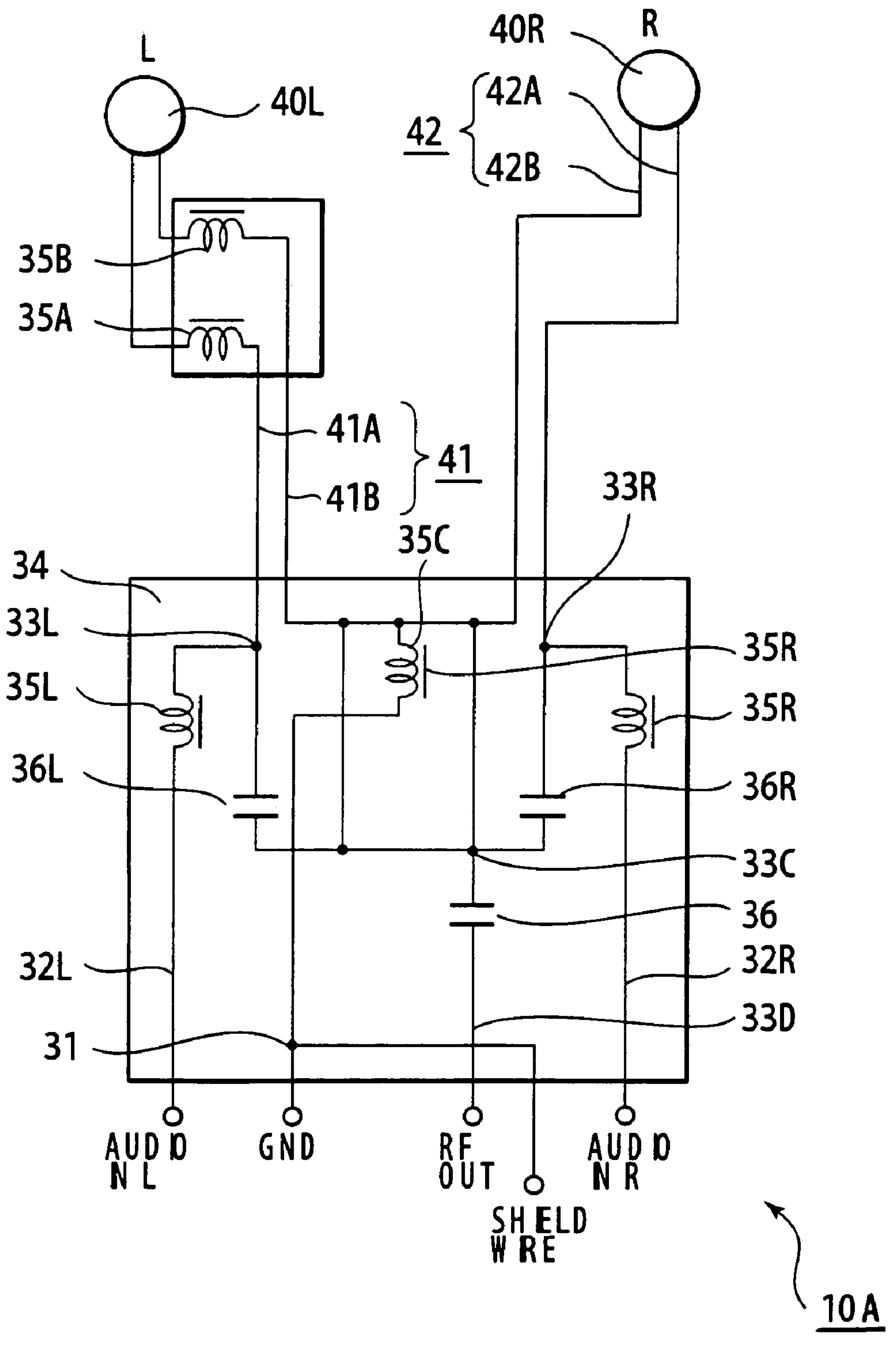
FIG. 9 is a schematic circuitry diagram showing the electrical configuration of another earphone antenna according to the present invention.

Still further, by inserting high frequency chokes (ferrite beads) 35A, 35B into an en route portion to one of the two earphone cables 41, 42, for example, to the earphone cable 41 for the left side audio signal as indicated in the earphone antenna 10A shown in FIG. 9, the antenna may be configured to separate high frequency signals and shorten its resonance length. The earphone antenna 10A shown in FIG. 9 may be configured so that the resonance length in one earphone antenna 41 is 250 mm, the resonance length in the other earphone antenna 42 is 400 mm, the characteristic impedance of the coaxial cable 24 is 75 Ω, and the length of the shielded cable 20 is 600 mm. By way of example, in the earphone antenna 10A, the other components are the same as those in the aforementioned earphone antenna 10. Therefore, the same components are indicated by the same symbols and numerals in FIG. 9, thereby permitting a detailed description thereof to be omitted.

Further, the present invention is also applicable to the case of a monophonic earphone where a single earphone cable is used.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An earphone antenna, comprising:

a first earphone cable including a pair of insulation-coated first signal lines for supplying audio signals to an earphone;

a shielded cable including a coaxial cable, an insulation-coated second signal line for audio signals and a grounding wire, the coaxial cable having a central conductor passing high frequency signals surrounded by an insulator and further surrounded by a first shield wire, the coaxial cable, the second signal line and the grounding wire collectively being surrounded by an insulation material and a second shield wire;

a multipin connector arranged on one end of the shielded cable and adapted to electrically connect the shielded cable to a radio apparatus; and a connection block connecting the other end of the shielded cable to the first earphone cable, the connection block including an audio signal transmission path formed by connecting the first shield wire of the coaxial cable to a ground, connecting the central conductor of the coaxial cable to the pair of first signal lines via a capacitor which exhibits high impedance in a frequency range of audio signals and low impedance in a frequency range of high frequency signals, and connecting the second signal line for audio signals and the grounding wire, respectively, to the pair of first signal lines via a high frequency choke which exhibits low impedance in the frequency range of audio signals and high impedance in the frequency range of high frequency signals;

wherein connecting the second shield wire to the ground causes formation of a sleeve antenna by the first earphone cable and the second shield wire.

2. The earphone antenna of claim 1, further comprising:

a second earphone cable including a second pair of insulation-coated first signal lines for supplying audio signals to an earphone;

the connection block connecting the other end of the shielded cable to the second earphone cable, the connection block further including another audio signal transmission path formed by connecting the central conductor of the coaxial cable to the second pair of first signal lines via a capacitor which exhibits high impedance in the frequency range of audio signals and low impedance in the frequency range of high frequency signals, and connecting the second signal line for audio signals and the grounding wire, respectively, to the second pair of first signal lines via a high frequency choke which exhibits low impedance in the frequency range of audio signals and high impedance in the frequency range of high frequency signals, wherein connecting the second shield wire to the ground causes formation of a sleeve antenna by the second earphone cable and the second shield wire;

a first stereophonic earphone connected to the connection block via the first earphone cable;

a second stereophonic earphone connected to the connection block via the second earphone cable; and a high frequency choke inserted in an en-route portion to at least one of the first and second earphone cables so as to create a resonance frequency in the first earphone cable which is different from the resonance frequency in the second earphone cable.

3. The earphone antenna of claim 1, further comprising a microphone and a switch mounted on the connection block.

4. The earphone antenna of claim 1, further comprising an amplifier mounted on the connection block.

5. A portable radio apparatus, comprising:

a main body having a tuner, an audio signal output unit and a multipin jack connected to the tuner and to the audio signal output unit; and an earphone antenna including an earphone cable having a pair of insulation-coated first signal lines for supplying audio signals to an earphone; a shielded cable including a coaxial cable, an insulation-coated second signal line for audio signals and a grounding wire, the coaxial cable having a central conductor passing high frequency signals surrounded by an insulator and further surrounded by a first shield wire, the coaxial cable, the second signal line and the grounding wire collectively being surrounded by an insulation material and a second shield wire; a multipin connector arranged on one end of the shielded cable and adapted for electrical connection to the multipin jack; and a connection block connecting the other end of the shielded cable to the earphone cable, the connection block including an audio signal transmission path formed by connecting the first shield wire of the coaxial cable to a ground, connecting the central conductor of the coaxial cable to the pair of first signal lines via a capacitor which exhibits high impedance in a frequency range of audio signals and low impedance in a frequency range of high frequency signals, and connecting the second signal line for audio signals and the grounding wire, respectively, to the pair of first signal lines via a high frequency choke which exhibits low impedance in the frequency range of audio signals and high impedance in the frequency range of high frequency signals;

wherein connecting the second shield wire to the ground causes formation of a sleeve antenna by the earphone cable and the second shield wire.

6. An earphone antenna, comprising:

a first earphone cable including a pair of insulation-coated first signal lines for supplying audio signals to an earphone;

a shielded cable including a coaxial cable, an insulation-coated second signal line for audio signals and a grounding wire, the coaxial cable having a central conductor passing high frequency signals surrounded by an insulator and further surrounded by a first shield wire, the coaxial cable, the second signal line and the grounding wire collectively being surrounded by an insulation material and a second shield wire;

a multipin connector arranged on one end of the shielded cable and adapted to electrically connect the shielded cable to a radio apparatus; and a connection block connecting the other end of the shielded cable to the first earphone cable, the connection block including an audio signal transmission path formed by connecting the first shield wire of the coaxial cable to a ground, connecting the central conductor of the coaxial cable to the pair of first signal lines via a capacitor which exhibits high impedance in a frequency range of audio signals and low impedance in a frequency range of high frequency signals, and connecting the second signal line for audio signals and the grounding wire, respectively, to the pair of first signal lines via a high frequency choke which exhibits low impedance in the frequency range of audio signals and high impedance in the frequency range of high frequency signals;

wherein connecting the second shield wire to the ground causes formation of a sleeve antenna by the first earphone cable and the second shield wire, the second shield wire of the sleeve antenna extending between the multipin connector and the connection block.

7. The earphone antenna of claim 6 wherein the second shield wire is flexible.

* * * * *